3,297,727
PURIFICATION OF ORGANIC ACIDS AND ANHYDRIDES
John H. McCracken, Pitcairn, and Johann G. D. Schulz and Arthur C. Whitaker, Pittsburgh, Pa., assignors to Gulf Research & Development Company, Pittsburgh, Pa., a corporation of Delaware
No Drawing. Filed Oct. 7, 1963, Ser. No. 314,511
10 Claims. (Cl. 260—346.4)

This invention relates to a new procedure for producing organic acids and the corresponding anhydrides, particularly organic acids and the corresponding anhydrides obtained from a 1,1-bis (3,4-dimethylphenyl)ethane.

The organic acid, a benzophenone 3,4,3′,4′-tetracarboxylic acid, can be obtained by subjecting a 1,1-bis (3,4-dimethylphenyl) ethane to oxidation with nitric acid having a concentration of about five to about 70 percent, preferably about 20 to about 40 percent. The amount of nitric acid employed, determined as the molar ratio of 100 percent nitric acid relative to the charge, is about 8.0 to about 17.0, preferably about 8.0 to about 12. The residence time required for oxidation can be from about one minute to about 48 hours, preferably about 10 minutes to about two hours. Temperatures of about 110° to about 350° C., preferably about 150° to about 250° C., can be employed. Pressures sufficient to maintain the reaction system primarily in the liquid phase, from about atmospheric to about 500 pounds per square inch gauge, or higher, are satisfactory. Upon completion of the reaction, the reaction product is permitted to cool down, preferably to room temperature, until a solid precipitate is formed. This may require, for example, from about four to about 24 hours. The crystals which are separated from the liquid in any convenient method, for example, by filtration, will be a benzophenone 3,4,3′,4′-tetracarboxylic acid. To obtain the corresponding dianhydride, a benzophenone 3,4,3′,4′-tetracarboxylicdianhydride, the benzophenone, 3,4,3′,4′-tetracarboxylic acid is dried, for example, at a temperature of about 110° to about 200° C. for about four to about 24 hours at atmospheric or reduced pressure.

The charge to the nitric acid oxidation stage need not be 1,1-bis (3,4-dimethylphenyl) ethane itself but one containing in place of the remaining six hydrogens on the rings one or more of such diverse radicals as F, Cl, Br, I, OH, $NO_2$, $NH_2$, $SO_3H$, etc., in which case the corresponding benzophenone 3,4,3′,4′-tetracarboxylic acid would be obtained. Thus the employment of 2-chloro, 3,4,3′,4′-tetramethyl diphenylethane, 2-hydroxy, 3,4,3′,4′-tetramethyl diphenylethane, 1,1-bis (3,4-dimethyl, 5-nitro-phenyl) ethane, 1,1-bis (2-amino, 4,5-dimethylphenyl) ethane and 1,1-bis (3,4-dimethyl, 5-sulfophenyl) ethane as charge to the nitric acid stage will result in the production of 2-chlorobenzophenone, 3,4,3′,4′-tetracarboxylic acid, 2-hydroxybenzophenone, 3,4,3′,4′-tetracarboxylic acid, 3,3′-dinitrobenzophenone,4,5,4′,4′-tetracarboxylic acid, 2,2′-dinitrobenzophenone, 4,5,4′,5′-tetracarboxylic acid and 3,3′-disulfobenzophenone, 4,5,4′,5′-tetracarboxylic acid, respectively. When any one of the acids described above are dried at a temperature of about 110° to about 170° C., as described above, the following dianhydrides are obtained: 2-chlorobenzophenone, 3,4,3′,4′ - tetracarboxylicdianhydride, 2 - hydroxybenzophenone, 3,4,3′,4′-tetracarboxylicdianhydride, 3,3′-dinitrobenzophenone, 4,5,4′,5′-tetracarboxylicdianhydride, 2,2′-dinitrobenzophenone, 4,5,4′,5′-tetracarboxylicdianhydride and 3,3′-disulfobenzophenone, 4,5,4′,5′ - tetracarboxylicdianhydride.

Unfortunately when the above-defined benzophenone 3,4,3′,4′-tetracarboxylic acids are recovered as well as the dianhydrides corresponding thereto, they are found in admixture with impurities that impart to the mixture an undesirable yellow color. In general the mixture obtained contains about 70 to about 95 percent by weight of the acid, or the corresponding dianhydride, with the remainder being the impurity that gives rise to the undesirable yellow color of the mixture.

We have found that a purified and substantially white tetraacid, or corresponding anhydride, can be obtained by first converting the tetraacid to the corresponding dianhydride in any convenient manner, for example, as described above, and thereafter treating said dianhydride with a liquid ketone. If a purified dianhydride is desired the ketone can be separated from the dianhydride and no further effort is required to obtain the desired compound. If, instead, the original tetraacid is desired the purified dianhydride can be converted back to the original tetraacid by hydrolysis in the usual manner, for example, by treating the same with at least the stoichiometric amount of water at a temperature of about 10° to about 200° C. and a pressure of about 15 to about 225 pounds per square inch gauge.

We have found that in order to obtain a purified tetraacid, or corresponding dianhydride, it is critical that the tetraacid first be converted to the corresponding dianhydride and the latter be treated with the defined ketone. In the event the tetraacid is treated with the ketone not all of the impurities present in the mixture will be removed therefrom. Apparently the impurities that are present in the tetraacid mixture are converted at the same time the tetraacid is converted to the corresponding dianhydride to compounds which are more easily removable by the ketone. Thus when the impure tetraacid mixture is treated with a ketone, the content of the tetraacid in the final mixture will be raised from an initial level of about 70 to about 95 percent by weight to about 93 to about 95 percent by weight. If, however, the mixture is first treated to convert the tetraacid to the corresponding dianhydride and the latter mixture is then treated with a ketone, the content of the dianhydride in the resulting mixture will rise from an initial level of about 70 to about 95 percent by weight to about 98 to about 100 percent by weight.

Any ketone which is liquid under the purification conditions defined herein and conforms to the following structural formula can be employed:

In the formula R and $R_1$, the same or different, can be an alkyl group having from one to about 10 carbon atoms, such as methyl, isopropyl, hexyl, decyl, etc. Specific examples of ketones that can be employed herein are acetone, methyl ethyl ketone, methyl isobutyl ketone, diisopropyl ketone, ethyl hexyl ketone, methyl decyl ketone, etc. Of these acetone is highly desirable because it is inexpensive, low boiling (and therefore easily removable from the system) and does not undergo aldol condensation with itself under the conditions employed herein to form undesirable impurities.

The purification procedure is effected by bringing the defined dianhydride in admixture with impurities into contact with the ketone in any suitable manner. A contact time of about one minute to about five hours, preferably about one minute to about one hour, is suitable. A temperature of about 25° to about 200° C., preferably about 25° to about 100° C., and a pressure of about 15 to about 400 pounds per square inch gauge, preferably about 15 to about 100 pounds per square inch gauge, can be employed. At the end of the treatment the ketone is separated from the dianhydride in any convenient way.

Since the dianhydride is a solid and is not appreciably soluble in the ketone, hot or cold, the most effective separation involves filtration.

The invention can further be illustrated by reference to the following. In the examples the charge impure benzophenone 3,4,3',4'-tetracarboxylic acid was obtained as follows. Into a stainless steel autoclave of approximately one liter capacity fitted with a stirrer, internal cooling coil, external electric heaters and means for manually venting gases to the atmosphere, there were placed 118.2 grams of 1,1-bis (3,4-dimethylphenyl) ethane and 640 grams of 70 percent nitric acid. The temperature in the autoclave was raised to 170° C. gradually over a period of two hours and held at this temperature for an additional two hours. The gases were vented intermittently so that the pressure was gradually allowed to climb to 200 pounds per square inch gauge. The reaction product was cooled to about 25° C. over a period of 0.5 hour and then discharged from the autoclave. After standing overnight a considerable amount of solid had precipitated. This was filtered off and the filtrate evaporated to approximately one-fifth of its original volume and cooled. A total of 125 grams of benzophenone 3,4,3',4'-tetracarboxylic acid was obtained. In the examples below wherein an impure benzophenone 3,4,3',4'-tetracarboxylicdianhydride was treated with a ketone, the tetraacid as obtained above was heated at a temperature of 190° C. for four hours to obtain the corresponding dianhydride. In each of the examples the acid or the anhydride was maintained in intimate contact with the ketone under the conditions indicated, after which the acid or anhydride was separated from the ketone by filtration.

tetracarboxylic acid, converting said tetracarboxylic acid to benzophenone 3,4,3',4'-tetracarboxylicdianhydride and thereafter contacting said dianhydride with a ketone having the following structural formula:

wherein R and $R_1$ are selected from alkyl groups having from one to 10 carbon atoms, to purify the same.

2. The process of claim 1 wherein the 1,1-bis(3,4-dimethylphenyl)ethane is treated with nitric acid to obtain benzophenone 3,4,3',4'-tetracarboxylic acid.

3. The process of claim 1 wherein said ketone is acetone.

4. The process of claim 1 wherein said ketone is methylethyl ketone.

5. The process of claim 1 wherein the ketone is heptanone-2.

6. The process of claim 1 wherein said ketone is acetone and the purified dianhydride is thereafter reconverted to the corresponding tetracarboxylic acid.

7. The process of claim 1 wherein said ketone is methylethyl ketone and the purified dianhydride is thereafter reconverted to the corresponding tetracarboxylic acid.

8. The process of claim 1 wherein the ketone is acetone and the treatment with acetone is effected at a temperature of about 25° C. to about 200° C. for about one minute to about five hours.

9. The process of claim 1 wherein the ketone is methylethyl ketone and the treatment with acetone is effected

TABLE I

| Ex. No. | Compound in mixture being treated | Grams of mixture | Percent by weight of such compound in mixture | Ketone employed in treatment | Total amount of ketone employed, milliliters | Length of treatment, minutes | Temperature of treatment, ° C. | Pressure of treatment, pounds per square inch gauge | Percent by weight of such compound after treatment |
|---|---|---|---|---|---|---|---|---|---|
| 1 | BTA* | 70 | 84.0 | Acetone | 140 | 30 | 23 | 14.7 | 94.0 |
| 2 | BTA* | 70 | 84.0 | do | 95 | 15 | 23 | 14.7 | 93.0 |
| 3 | BTA* | 35 | 84.0 | do | 95 | 15 | 23 | 14.7 | 93.5 |
| 4 | BTA* | 300 | 83.5 | do | 500 | 60 | 150 | 150 | 95.0 |
| 5 | BTA* | 300 | 91.0 | do | 500 | 60 | 150 | 150 | 94.0 |
| 6 | BTA* | 340 | 91.0 | do | 567 | 60 | 100 | 47.0 | 94.0 |
| 7 | BTDA** | 20 | 95.0 | do | 100 | 15 | 50 | 14.7 | 99.0 |
| 8 | BTDA** | 681 | 95.0 | do | 816 | 15 | 23 | 14.7 | 98.0 |
| 9 | BTDA** | 681 | 95.0 | do | 1,316 | 15 | 23 | 14.7 | 98.0 |
| 10 | BTDA** | 40 | 94.0 | do | 150 | 120 | 56 | 14.7 | 100.0 |
| 11 | BTDA** | 1,004 | 93.5 | do | 550 | 1 | 23 | 14.7 | 100.0 |
| 12 | BTA | 70.0 | 87.0 | Methylethyl ketone | 290 | 15 | 23 | 14.7 | 91.0 |
| 13 | BTA | 70.0 | 87.0 | do | 145 | 15 | 23 | 14.7 | 93.0 |
| 14 | BTDA | 70.0 | 93.8 | do | 290 | 15 | 23 | 14.7 | 97.5 |
| 15 | BTA | 70.0 | 92.5 | Heptanone-2 | 145 | 15 | 23 | 14.7 | 94.0 |
| 16 | BTDA | 30.5 | 91.0 | do | 95 | 15 | 23 | 14.7 | 98.5 |

*Denotes benzophenone-3,4,3',4'-tetracarboxylic acid.
**Denotes benzophenone-3,4,3',4'-tetracarboxylicdianhydride.

The charge for Example 13 was obtained by combining the treated tetraacids of Examples 11 and 12 and thereafter dehydrating the same. The data in Table I amply show that the defined tetraacid can not be adequately purified by treating the same with a ketone. Thus in no case was a product obtained containing more than 95 percent by weight of the acid. Treatment of the corresponding dianhydride with a ketone, however, can result in a susbtantially pure dianhydride.

Obviously, many modifications and variations of the invention as hereinabove set forth can be made without departing from the spirit and scope thereof and therefore only such limitations should be imposed as are indicated in the appended claims.

We claim:
1. A process which comprises oxidizing 1,1-bis(3,4-dimethylphenyl)ethane to obtain benzophenone 3,4,3',4'- at a temperature of about 25° C. to about 200° C. for about one minute to about five hours.

10. The process of claim 1 wherein the tetracarboxylic acid is dried at a temperature of about 110° to about 170° C. for about four to about 24 hours to obtain the corresponding dianhydride, the dianhydride so obtained is treated with acetone at a temperature of about 25° to about 200° C. for about one minute to about five hours to purify the same and the purified dianhydride is thereafter hydrolized to reconvert the same to the corresponding tetracarboxylic acid.

References Cited by the Examiner
UNITED STATES PATENTS 3,078,279   2/1963   McCracken et al. ___ 260—346.4

NICHOLAS S. RIZZO, *Primary Examiner.*